US009987878B2

(12) United States Patent
Chen

(10) Patent No.: US 9,987,878 B2
(45) Date of Patent: Jun. 5, 2018

(54) REINFORCING STRUCTURE OF CARBON FIBER RIM

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

(*) Notice: Subject to any disclaimer, the term of this patent is extended or adjusted under 35 U.S.C. 154(b) by 0 days. days.

(21) Appl. No.: 15/276,965

(22) Filed: Sep. 27, 2016

(65) Prior Publication Data

US 2018/0086136 A1   Mar. 29, 2018

(51) Int. Cl.
*B60B 5/02* (2006.01)
*B60B 1/00* (2006.01)
*B60B 21/02* (2006.01)

(52) U.S. Cl.
CPC ............... *B60B 5/02* (2013.01); *B60B 1/003* (2013.01); *B60B 21/025* (2013.01); *B60B 2360/104* (2013.01); *B60B 2360/106* (2013.01); *B60B 2360/362* (2013.01); *B60B 2900/111* (2013.01)

(58) Field of Classification Search
CPC ....... B60B 5/02; B60B 21/062; B60B 21/025; B60B 1/003
USPC .................................................... 301/95.107
See application file for complete search history.

(56) References Cited

U.S. PATENT DOCUMENTS

| 4,146,274 A * | 3/1979 | Lejeune | B60B 21/00 301/64.703 |
|---|---|---|---|
| 4,173,992 A * | 11/1979 | Lejeune | B60B 5/02 152/381.3 |
| 4,741,578 A * | 5/1988 | Viellard | B60B 5/02 301/58 |
| 5,975,645 A * | 11/1999 | Sargent | B60B 1/003 301/55 |
| 8,882,207 B2 * | 11/2014 | Matsui | B60B 5/02 301/95.103 |
| 2003/0107260 A1 * | 6/2003 | Ording | B60B 5/02 301/95.102 |
| 2004/0222689 A1 * | 11/2004 | Okajima | B60B 1/0284 301/55 |
| 2005/0253446 A1 * | 11/2005 | Okajima | B60B 1/0284 301/58 |

(Continued)

FOREIGN PATENT DOCUMENTS

| DE | 202015102380 U1 * | 6/2015 | ............. B60B 1/041 |
|---|---|---|---|
| EP | 1386756 A2 * | 2/2004 | ............. B60B 1/041 |

(Continued)

*Primary Examiner* — Kip T Kotter
(74) *Attorney, Agent, or Firm* — Rosenberg, Klein & Lee

(57) ABSTRACT

A reinforcing structure of a carbon fiber rim is provided. A rim body is made from a carbon fiber material. The rim body includes an external diameter edge to be assembled with a tire, an inner diameter edge to be assembled to a hub via spokes, and two side sections between the outer diameter edge and the inner diameter edge. Metal reinforcing sheets are respectively disposed on the spoke assembling positions of the inner diameter edge and wrapped by the carbon fiber material, and each reinforcing sheet has two opening edges and a middle ring section connecting the two opening edges. The middle ring section is disposed with a reinforcing part corresponding to the inner diameter edge of the rim body and two reinforcing edge parts corresponding to two side edge sections.

3 Claims, 4 Drawing Sheets

(56) References Cited

U.S. PATENT DOCUMENTS

| | | | |
|---|---|---|---|
| 2007/0102995 A1* | 5/2007 | Okajima | B60B 1/041 301/58 |
| 2007/0205653 A1* | 9/2007 | Okajima | B60B 1/041 301/95.102 |
| 2008/0174168 A1* | 7/2008 | Yang | B60B 1/003 301/95.102 |
| 2010/0090519 A1* | 4/2010 | Lin | B60B 5/02 301/58 |
| 2015/0251489 A1* | 9/2015 | Lin | B60B 21/064 156/196 |

FOREIGN PATENT DOCUMENTS

| | | | |
|---|---|---|---|
| TW | I341799 B | 6/1996 | |
| TW | I374814 B | 12/1997 | |

* cited by examiner

REINFORCING STRUCTURE OF CARBON FIBER RIM

BACKGROUND

Field of Invention

The disclosure relates to a reinforcing structure of a carbon fiber rim. More particularly, the disclosure relates to a reinforcing structure of a carbon fiber rim for decreasing the overall weight.

Description of Related Art

Rims of bicycles may be made of an aluminum alloy or carbon fiber. These two materials both have advantages and disadvantages. The aluminum alloy has advantages of high ductility and low cost, but has disadvantages of low hardness and heavy weight. Contrarily, the carbon fiber has advantages of high hardness and lightweight, but has disadvantages of low ductility and high cost. However, components of high-grades bicycles made using carbon fiber composite materials have become a common practice. The carbon fiber materials having properties of high strength, high rigidity, and being lightweight, applied on components of bicycles, can satisfy the requirements of the bicycle industry.

In the manufacturing process of carbon fiber rims, both the factors of cost and need to be lightweight have to be considered. Therefore, the carbon fiber rims in the market all have hollow annular structures, which are made by stacking carbon fiber cloth followed by thermal compression. Therefore, the structural strength of some parts, such as at the spoke assembling positions, can be decreased by hole formation. Since the ductility of the carbon fiber is decreased after curing, in addition to having a hollow structure, the stress and the tension applied to the spoke assembling positions, can lead to the rim being damaged due to the insufficient strength. Especially, when the carbon fiber rim is pulled by external forces, the spoke assembling positions of the rim will be broken and damaged since the spoke assembling portions cannot withstand the external forces and that damage affects the overall strength of the carbon fiber rim. Thus, the carbon fiber rim cannot operate normally.

In light of the drawbacks above, Taiwan Patent No. I374814 B discloses a multi-layer reinforcement element applied on at least one portion of the inner annular side of a bicycle rim. The multi-layer reinforcement element comprises an inner annular side, an outer annular side, and an intermediate portion between the inner annular side and the outer annular side. The intermediate portion is in a frustum of pyramid-like configuration comprising at least two layers and four inclined areas. Taiwan Patent No. I341799 B discloses a bicycle rim, which comprises an annular metallic rim member and a reinforcing member. The annular metallic rim member includes a pair of opposite-facing annular brake surfaces and a plurality of spoke attachment areas with at least one spoke attachment opening in each of the spoke attachment areas. The reinforcing member overlays an exterior surface of the annular metallic rim member, but not the annular brake surfaces. The reinforcing member includes a plurality of spoke attachment sections individually arranged in a circumferential direction to overlay the spoke attachment openings. The spoke attachment sections include a plurality of discrete first reinforcing parts and a plurality of discrete second reinforcing parts. The first reinforcing parts are attached to the spoke attachment areas around the spoke attachment openings. The second reinforcing parts are attached to the spoke attachment areas to overlay the first reinforcing parts, with the second reinforcing parts being larger than the first reinforcing parts.

However, the structures above have the drawbacks illustrated below.

1. The aforesaid disclosures are directed to localized strengthening technologies applied to the spoke attachment portions, and thus, the overall weight of the rim is increased. At the same time, when the spoke attachment portions are pulled by external forces applied to the corresponding spokes, stress problems will occur to cause damage at the spokes attaching portions.

2. As stated above, in the process of covering carbon fiber layers, the defect rate is easily increased.

3. Relatively, the cost is increased.

SUMMARY

In one aspect, a reinforcing structure of a carbon fiber rim is provided. Specifically, this reinforcing structure can increase the tensile strength of the carbon fiber rim and decrease the overall weight of the carbon fiber rim.

The reinforcing structure of a carbon fiber rim comprises a rim body and metal reinforcing sheets. The rim body is made from a carbon fiber material. The rim body comprises an external diameter edge to be assembled with a tire, an inner diameter edge to be assembled with a hub via spokes, and two side sections between the outer diameter edge and the inner diameter edge. Metal reinforcing sheets are respectively disposed on spoke assembling positions of the inner diameter edge and wrapped by the carbon fiber material, and each has two opening edges and a middle ring section connecting the two opening edges. A thickness of each metal reinforcing sheet is decreased from the middle ring section to the two opening edges. The middle ring section is disposed with a reinforcing part corresponding to the inner diameter edge of the rim body and two reinforcing edge parts corresponding to two side edge sections. A thickness of each metal reinforcing sheet is increased from the reinforcing edge parts to the reinforcing part. Therefore, the tensile strength at the spoke assembling positions can be effectively increased and achieve the lightweight effect.

In an embodiment of this invention, a through hole is disposed in the reinforcing part through each metal reinforcing sheet for assembling with a spoke.

In an embodiment of this invention, the metal reinforcing sheets are made of an aluminum alloy, a magnesium alloy, or an aluminum-magnesium alloy.

In an embodiment of this invention, a ratio of a minimum thickness of the reinforcing edge parts to a maximum thickness of the reinforcing parts is 1:3 to 1:6.

DETAILED DESCRIPTION

Figure 1:
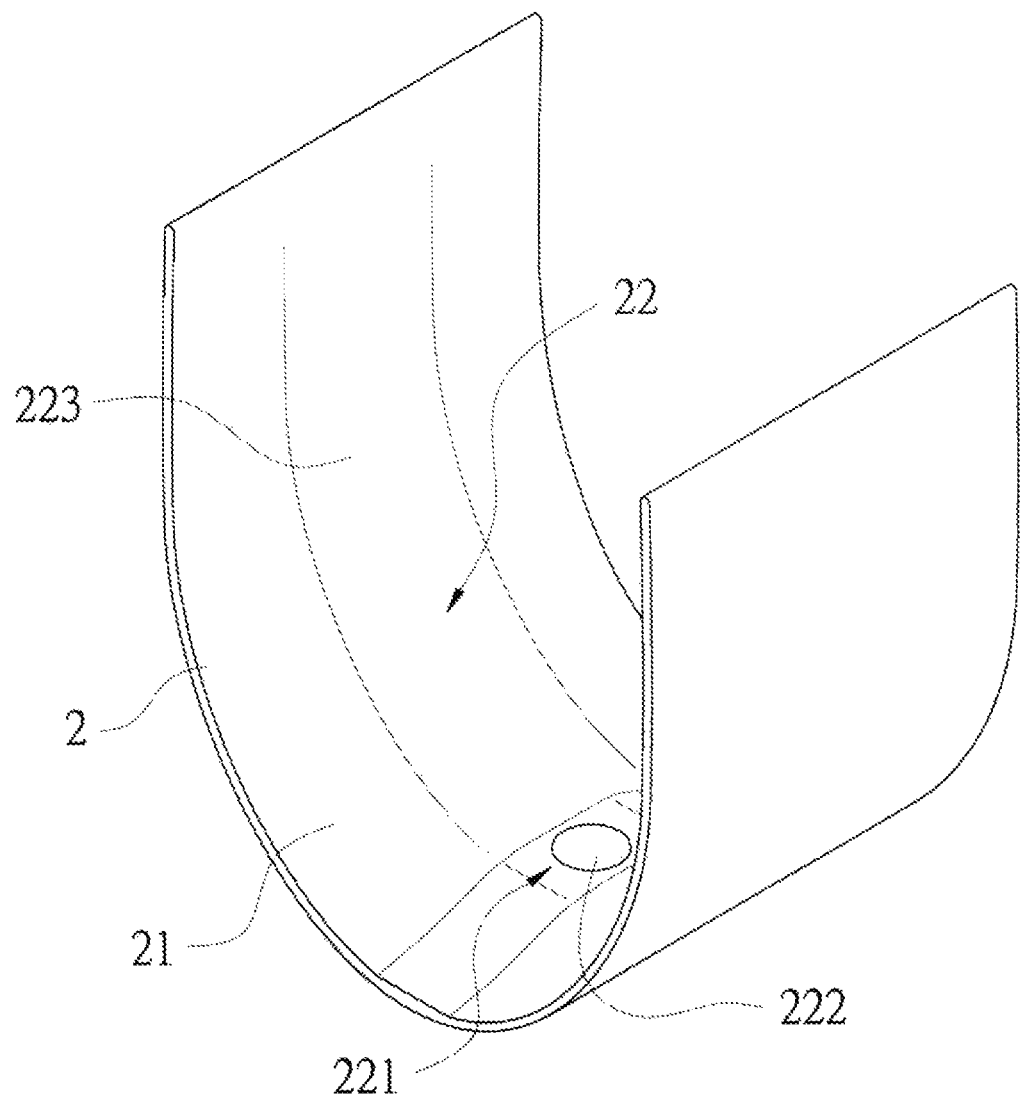
FIG. 1 is a perspective view of this invention.
Figure 2:
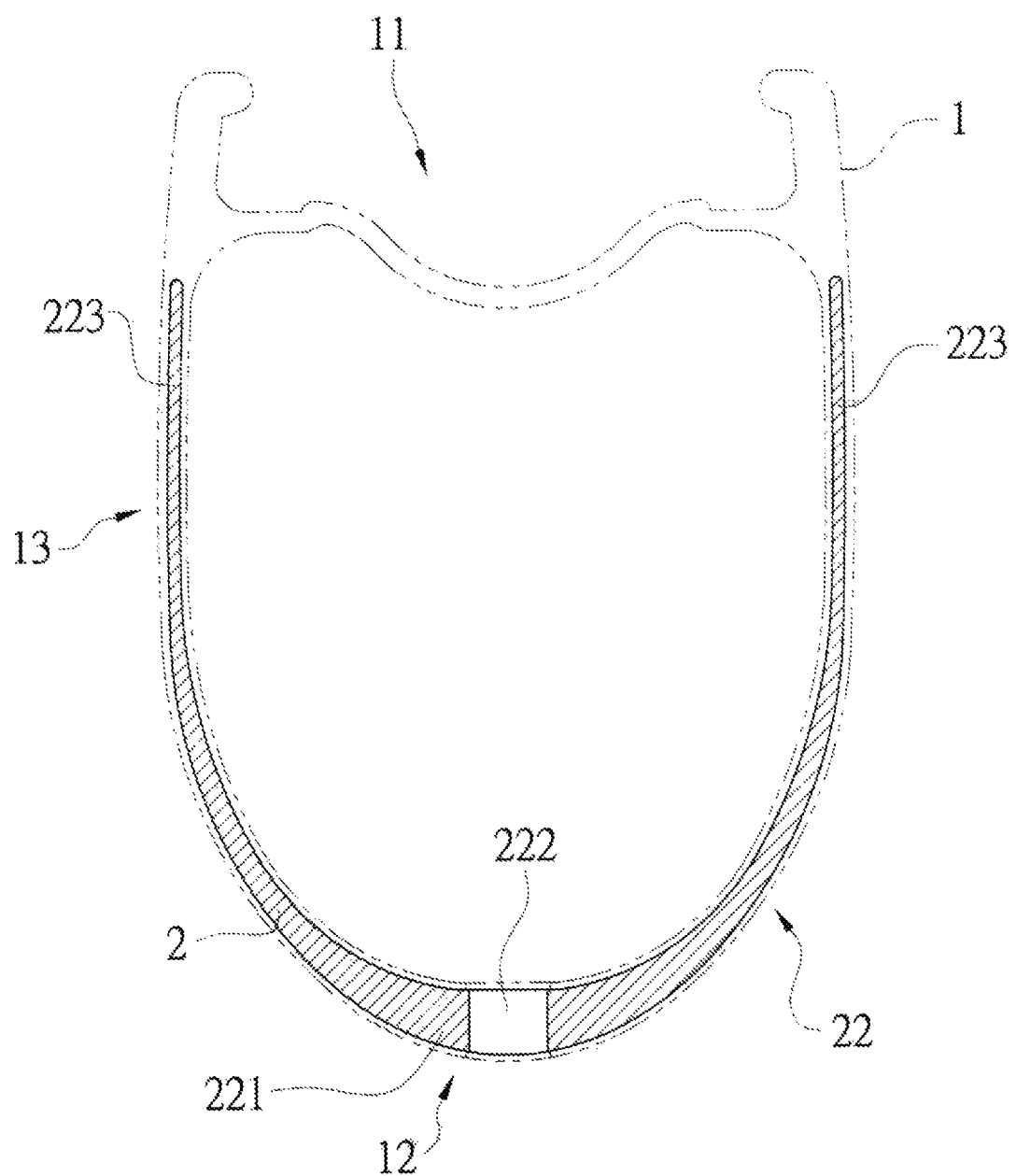
FIG. 2 is a radial cross-sectional view of this invention.
Figure 3:
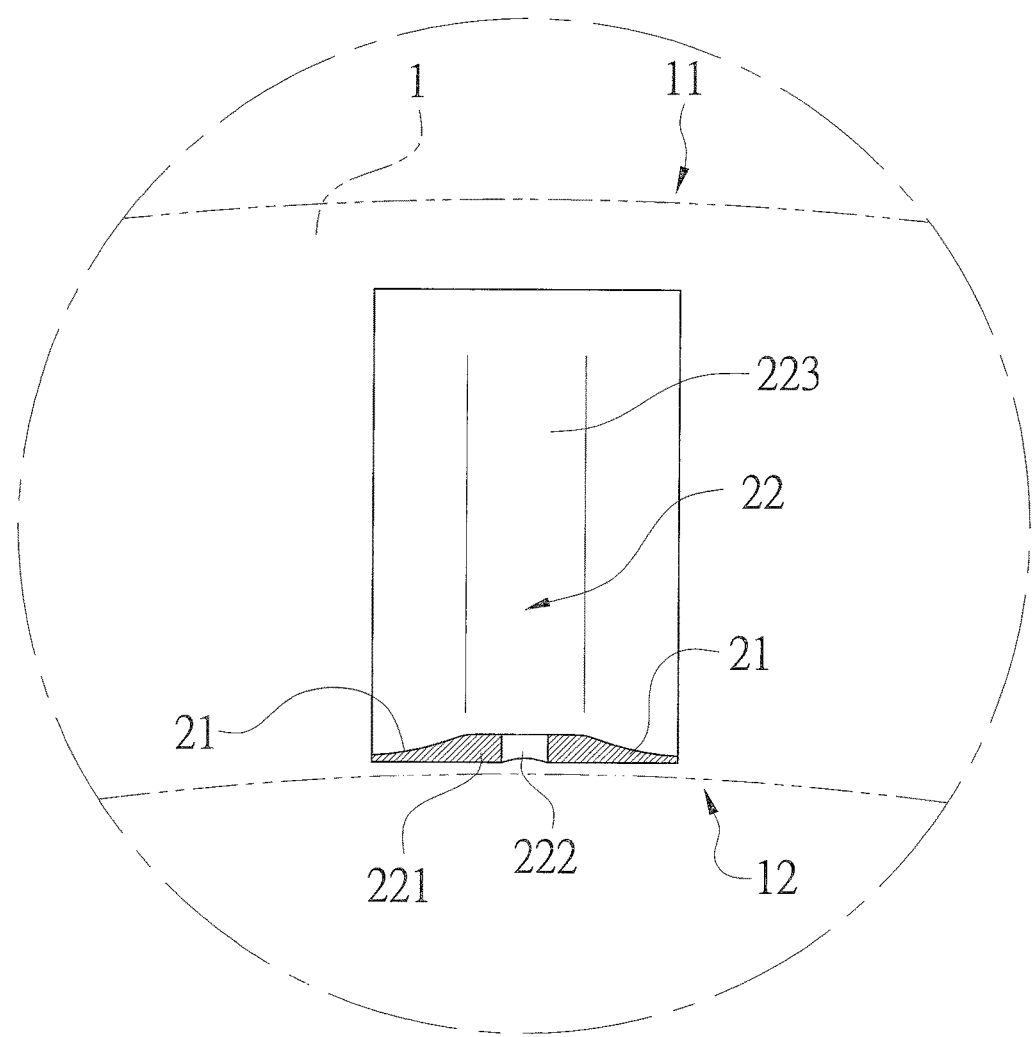
FIG. 3 is a cross-sectional view of the middle ring section of this invention.

First, please refer to FIGS. 1-3. The reinforcing structure of the carbon fiber rim comprises a rim body 1 and multiple metal reinforcing sheets 2.

The rim body 1 is made from carbon fiber. The rim body 1 comprises an external diameter edge 11 to be assembled with a tire, an inner diameter edge 12 to be assembled to a hub via spokes, and side edge sections 13 between the outer diameter edge 11 and the inner diameter edge 12.

The metal reinforcing sheets 2 are each wrapped by the carbon fiber of the rim body 1 and located at respective spoke assembling positions on the inner diameter edge 12 of the rim body 1. Corresponding to the radial direction of the rim body 1, the metal reinforcing sheets 2 have two opening edges 21 and a middle ring section 22 connecting the two opening edges 21. A thickness of each metal reinforcing sheet is decreased from the middle ring section 22 to the opening edges 21. The middle ring section 22 of each metal reinforcing sheet 2 is disposed with a reinforcing part 221 corresponding to the inner diameter edge 12 of the rim body 1 and two reinforcing edge parts 223 corresponding to the two side edge sections 13 of the rim body 1. The reinforcing part 221 has a through hole 222 to be assembled with a spoke. The reinforcing edge parts 223 are formed at two sides of the reinforcing part 221. A thickness of each metal reinforcing sheet is increased from the reinforcing edge parts 223 to the reinforcing part 221.

Figure 4:
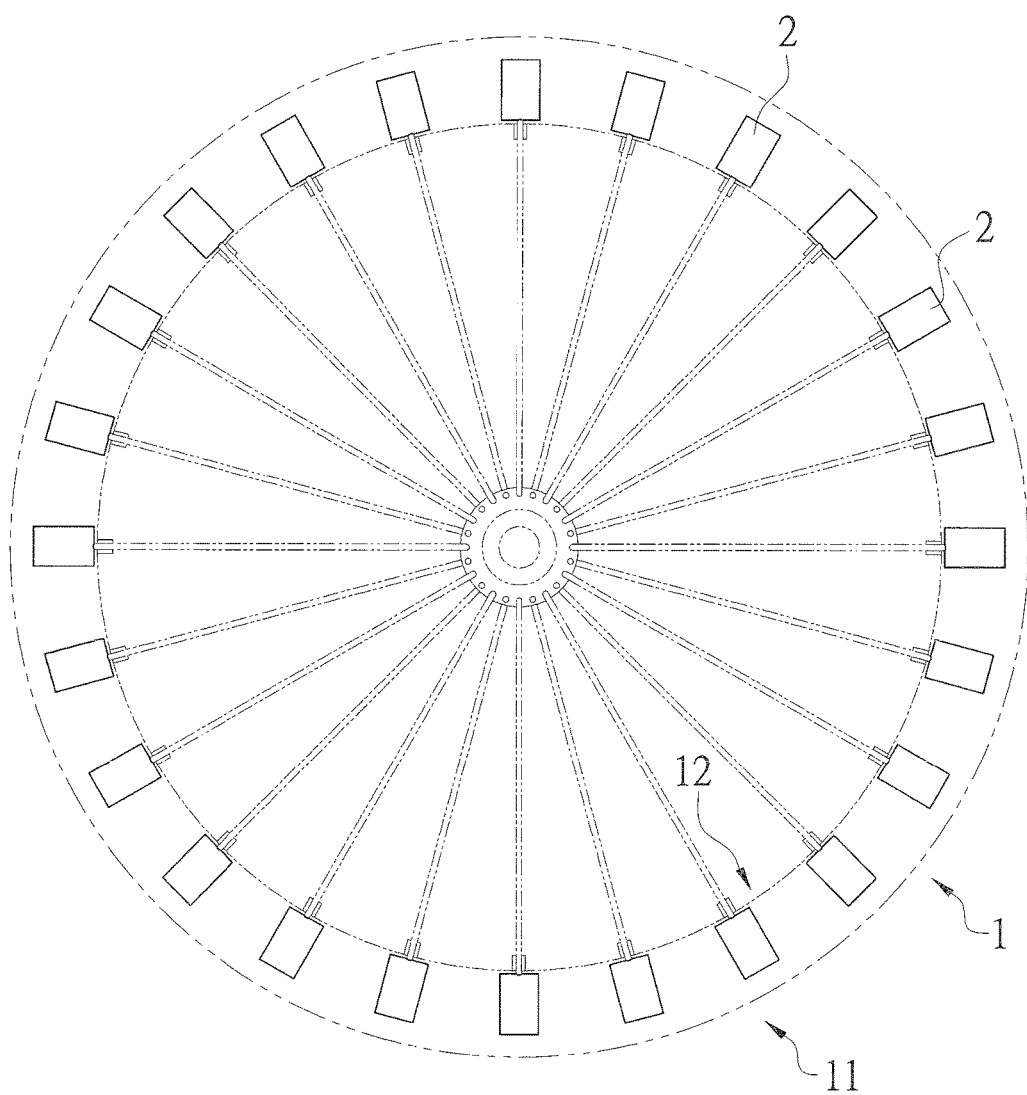
FIG. 4 is a view showing the reinforcing structure of this invention combined with a rim body.

As shown in FIGS. 1-3, when the carbon fiber rim is manufactured, the rim body 1 is mainly made from carbon fiber cloth. Each side surface needs at least 6 to 8 sheets of carbon fiber cloth to be alternatingly connected. In the manufacturing process, the metal reinforcing sheets 2 are placed in molds at the spoke assembling positions. The metal reinforcing sheets 2 may be made of an aluminum alloy, magnesium alloy, or aluminum-magnesium alloy. The number of the metal reinforcing sheets 2 depends on the number of spokes. In FIG. 4, the 24 spokes correspond with the 24 metal reinforcing sheets 2.

When the metal reinforcing sheets 2 are placed in the mold, the carbon fiber cloth is attached from inside to outside. The carbon fiber cloth is attached on the middle ring section 22 toward the opening edges 21, and compressed gradually, so that the inside and outside carbon fiber cloth can be tightly sealed and integrated as one. At the time of attaching the carbon fiber cloth to form the side edge sections 13, through the design of gradually increasing the thickness of each metal reinforcing sheet from the reinforcing edge parts 223 to the reinforcing part 221, the carbon fiber can be smoothly attached to combine the reinforcing edge part 223 and the side edge sections 13 of the rim body 1 together.

In order to reinforce the tensile strength of the rim body 1, a preferred ratio was obtained via many experimental trials. The ratio of the minimum thickness to the maximum thickness of the thickness from the reinforcing edge parts 223 to the reinforcing part 221 was in a range from 1:3 to 1:6.

In comparison with conventional structures, the reinforcing structure has the following advantages:

1. In this invention, since the metal reinforcing sheets are disposed on the spoke assembling positions of the rim, the tensile strength of the rim can be effectively increased to enhance the tensile property.

2. In this invention, the metal reinforcing sheets are disposed on the spoke assembling positions of the rim. This distribution on the key positions can increase the tensile strength and further achieve the purpose of lightweight.

3. In this invention, the design of each metal reinforcing sheet, where the thickness gradually decreases on the opening edges, allows the carbon fiber cloth to be attached on the rim body more tightly. Therefore, no interspaces are formed that can destroy the strength of the carbon fiber rim.

4. In this invention, the design of each metal reinforcing sheets, where the thickness gradually increases from the reinforcing edge parts to the reinforcing part, allows the reinforcing parts to be connected to the side edge sections of the rim at the time the carbon fiber cloth is attached.

What is claimed is:

1. A reinforced carbon fiber rim, comprising:
    a rim body made from a carbon fiber material, the rim body having an external diameter edge for receiving a tire, an inner diameter edge for assembly to a hub via a plurality of spokes, and two side sections disposed between the outer diameter edge and the inner diameter edge, the inner diameter edge having a plurality of spoke assembling portions spaced one from another; and
    a plurality of metal reinforcing sheets respectively disposed at the plurality of spoke assembling portions, each of the plurality of metal reinforcing sheets being wrapped by the carbon fiber material of the rim body and having two opening edges and a middle ring section connecting the two opening edges along a radial direction of the rim body, a thickness of each metal reinforcing sheet decreases continuously from the middle ring section to a respective end of each of the two opening edges, the middle ring section of each metal reinforcing sheet includes a reinforcing part disposed in correspondence with the inner diameter edge of the rim body and includes two reinforcing edge parts, each reinforcing edge part extending through a respective one of the two side edge sections of the rim body, the reinforcing part of each of the plurality of metal reinforcing sheets having a through hole formed therein for receiving a corresponding one of the plurality of spokes therein, the reinforcing edge parts are formed at two sides of the reinforcing part, and the thickness of each metal reinforcing sheet decreases continuously from the reinforcing part to a respective end of each of the two reinforcing edge parts.

2. The reinforcing structure of claim 1, wherein a ratio of a minimum thickness of each metal reinforcing sheet at the end of the reinforcing edge parts to a maximum thickness of each metal reinforcing sheet at the reinforcing part is from 1:3 to 1:6.

3. The reinforcing structure of claim 1, wherein the plurality of metal reinforcing sheets are formed of one of an aluminum alloy, a magnesium alloy, or an aluminum-magnesium alloy.

* * * * *